United States Patent [19]
Hehl

[11] 3,738,618
[45] June 12, 1973

[54] INJECTION UNIT FOR AN INJECTION MOLDING MACHINE

[76] Inventor: Karl Hehl, 183 Siedlung, D-7291 Lossburg, Wurttemberg, Germany

[22] Filed: Oct. 5, 1971

[21] Appl. No.: 186,674

[30] Foreign Application Priority Data
  Oct. 5, 1970  Germany................... P 20 48 796.1
  Mar. 18, 1970  Germany................... P 21 12 996.4

[52] U.S. Cl. .............................................. 259/191
[51] Int. Cl. .............................................. B01f 7/24
[58] Field of Search ................. 259/185, 191, 192, 259/193, 5, 21; 425/245, 190, 191, 146, 192

[56] References Cited
UNITED STATES PATENTS

| | | | |
|---|---|---|---|
| 2,950,501 | 8/1960 | Harkenrider | 425/146 |
| 3,020,591 | 2/1962 | Breher | 425/245 |
| 3,169,275 | 2/1965 | Compton | 259/191 |
| 3,204,294 | 9/1965 | Brochetti | 259/191 |

*Primary Examiner*—Robert W. Jenkins
*Attorney*—George H. Spencer, Harvey Kaye and Jay M. Finkelstein

[57] ABSTRACT

An injection unit for an injection molding machine, supported on struts and including a plasticizing cylinder within which a conveying worm is displaceable, hydraulic cylinders for driving the conveying worm and one or a pair of cylinders for driving the injection unit relative to the injection molding machine, and means for controlling the hydraulic cylinders. Sleeves are provided in conjunction with those hydraulic cylinders which effect the movement of the conveying worm and are concentrically arranged with respect to the struts and support the pistons for the hydraulic cylinders. These sleeves are provided with recesses for accommodating a lubricating medium which lubricates the struts during the movement of the conveying worm.

21 Claims, 12 Drawing Figures

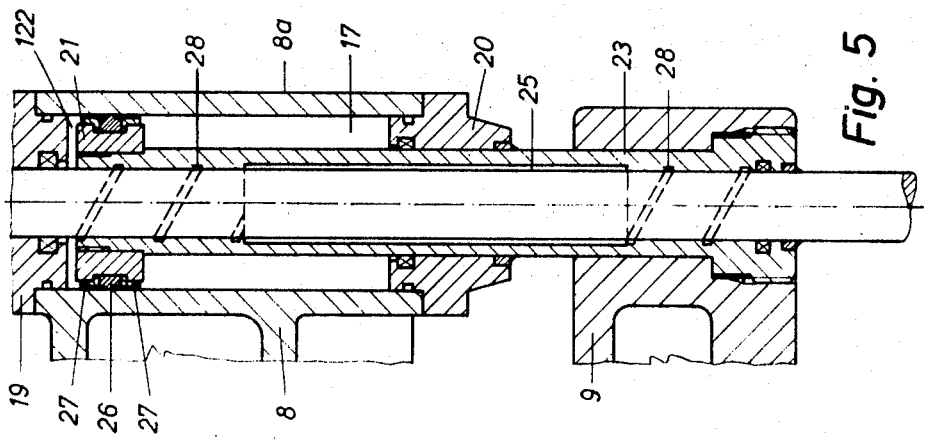
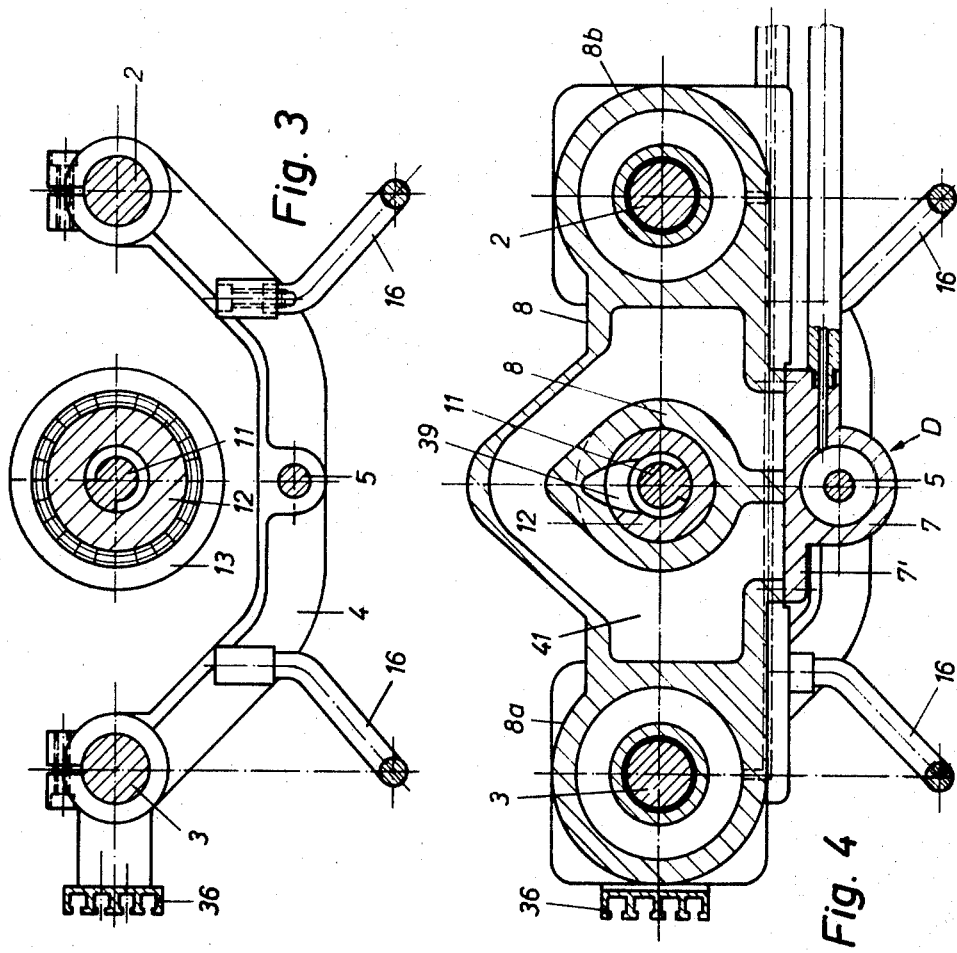

Fig. 11

INJECTION UNIT FOR AN INJECTION MOLDING MACHINE

BACKGROUND OF THE INVENTION

The present invention relates to an injection unit supported by supporting struts, particularly for an injection molding machine for processing synthetics including a plasticizing cylinder which is displaceable in the direction of the injection axis by means of a hydraulic drive supported at the supporting struts and a conveying worm which is axially displaceable relative to the plasticizing cylinder by means of at least one hydraulic drive cylinder which is supported by the plasticizing cylinder which is a hydraulic cylinder, and is guided along the supporting struts by means of a supporting bridge.

Injection units of this type require some form of maintenance. For example, they must be lubricated, even though only at infrequent time intervals, for example, in the area of the slide bearings for the supporting bridge of the conveying worm, which bridge is guided on struts.

Also, the structural length of the injection unit is rather long due to the fact that the drive cylinders for the conveying worm and for the injection unit as a whole often are coaxial with respect to one another. In those instances where a single hydraulic drive cylinder is used for driving the conveying worm in the plasticizing cylinder of the injection unit, the drive cylinder is generally flanged to the rear end of the conveying worm and coaxial therewith resulting in a long structural length.

Another consideration is that when injection units of the type under consideration are provided with hydraulic drive cylinders disposed coaxially to the supporting struts their pistons are in general an integral component of these struts. This is undesirable from a manufacturing point of view because struts and pistons must then be made of one piece.

SUMMARY OF THE INVENTION

It is a general object of the present invention to avoid the above-mentioned drawbacks and to provide an injection unit of the above-mentioned type which has a minimum structural length and is practically maintenance-free while offering favorable conditions for mass production.

It is a more particular object of the present invention to provide an injection unit for an injection molding machine wherein support struts are provided including concentrically arranged sleeves which support the pistons of the hydraulic cylinders which effect the relative movement of a conveying worm within a plasticizing cylinder and wherein the outer surfaces of the support struts are lubricated during the relative movement of the conveying worm.

These and other objects are accomplished according to the present invention by the provision of sleeves, which are fastened to a supporting bridge of a conveying worm of the injection unit and which enclose the supporting struts while being slidable mounted thereon. These sleeves constitute supports for the pistons of the hydraulic cylinders forming part of the injection unit. These cylinders effect the relative movement between the conveying worm and a plasticizing cylinder of the injection unit within which the worm is displaceable. The plasticizing cylinder is supported by a supporting bridge which also has formed preferably integrally therewith the hydraulic cylinder. The inner surfaces of the sleeves which slide on the outer surface of the struts are provided with recesses which accommodate a pressure medium reaching these recesses so that the outer surface of the struts is lubricated in the course of the relative movement between the sleeves and struts.

With such a configuration the pistons of the hydraulic cylinders are disposed approximately at the level of or within the supporting bridge for the plasticizing cylinder which results in an extraordinarily short structural length for the injection unit and offers advantages as regards production techniques since the pistons of these hydraulic cylinders are no longer integral components of the struts.

Also by providing relatively long sleeves which slide on the struts, the supporting bridge for the conveying worm is guided on the supporting struts in an improved manner during actuation of the cylinders.

Advisably the device which moves the injection unit as a whole comprises two hydraulic drive cylinders which are disposed on both sides of the injection unit and in symmetry with its injection axis, although it should be understood that a single hydraulic drive cylinder could be advantageously utilized.

Advisably the hydraulic drive cylinders are disposed in a horizontal plane including the injection axis when the injection unit is disposed horizontally.

BRIEF DESCRIPTION OF THE DRAWINGS

FIG. 3 is a cross-sectional view taken along line 3—3 of FIGS. 1 and 2 illustrating the injection unit in the area of the stabilizing bridge.

FIG. 4 is a cross-sectional view taken along line 4—4 in FIGS. 1 and 2 illustrating the injection unit in the area of the supporting bridge of the plasticizing cylinder.

FIG. 5 is a cross-sectional view to an enlarged scale of a portion of the injection unit of the present invention.

FIG. 11 is a cross-sectional view of a further embodiment of the injection unit of the present invention.

DESCRIPTION OF THE PREFERRED EMBODIMENTS

The injection unit of the present invention is intended particularly for use with injection molding machines. However, it may also be used as an independent unit, for example, in an assembly line.

It the embodiment of FIGS. 1–4, supporting struts 2, 3 of an injection unit are held with their front ends 2a, 3a in socket sleeves 1' of a stationary clamping plate 1 of a locking device of the injection molding machine of which the illustrated unit forms a part. They are there secured by means of coaxially disposed clamping screws 15.

Figure 1:
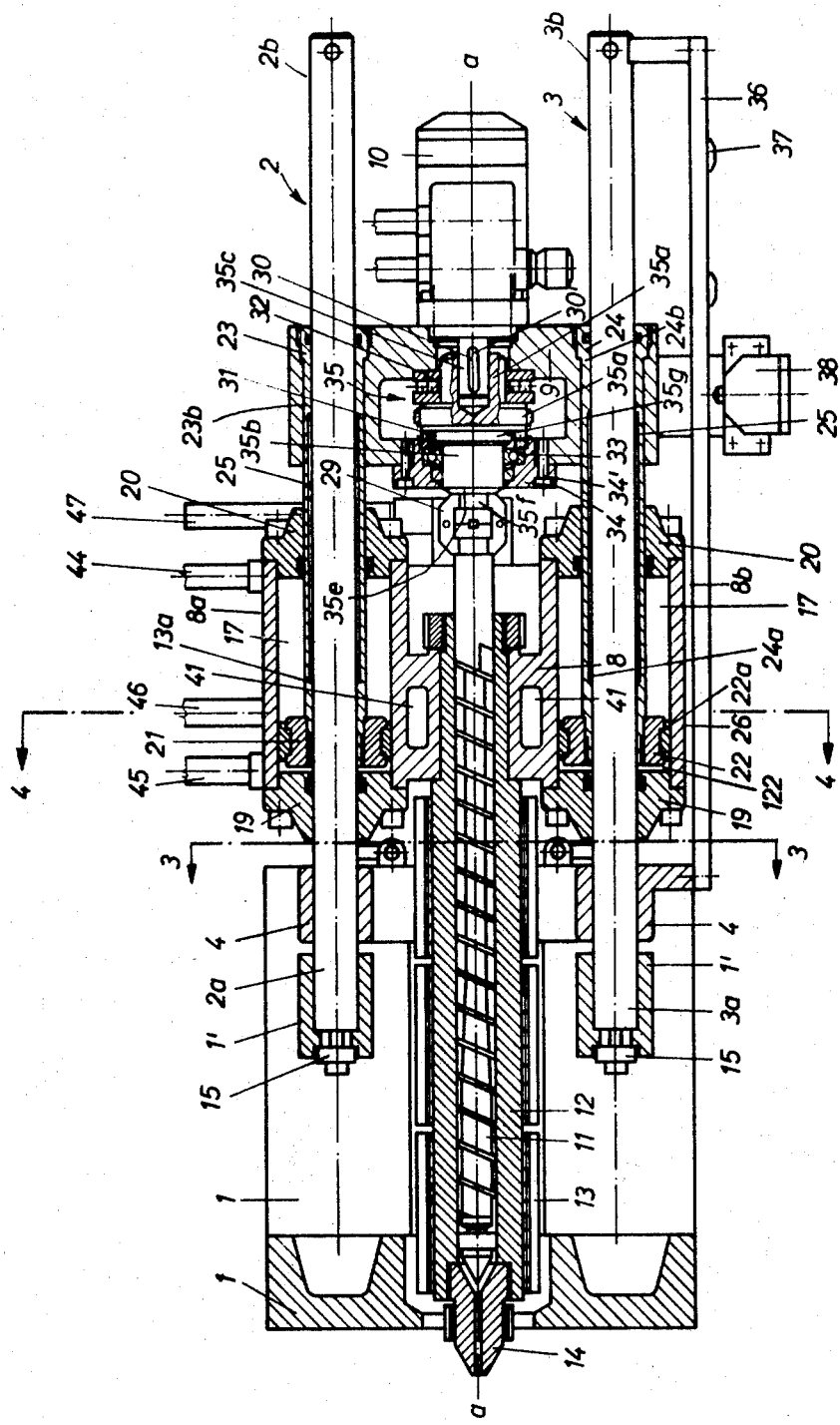
FIG. 1 is a cross-sectional plan view of one embodiment of the injection unit of the present invention.
Figure 2:
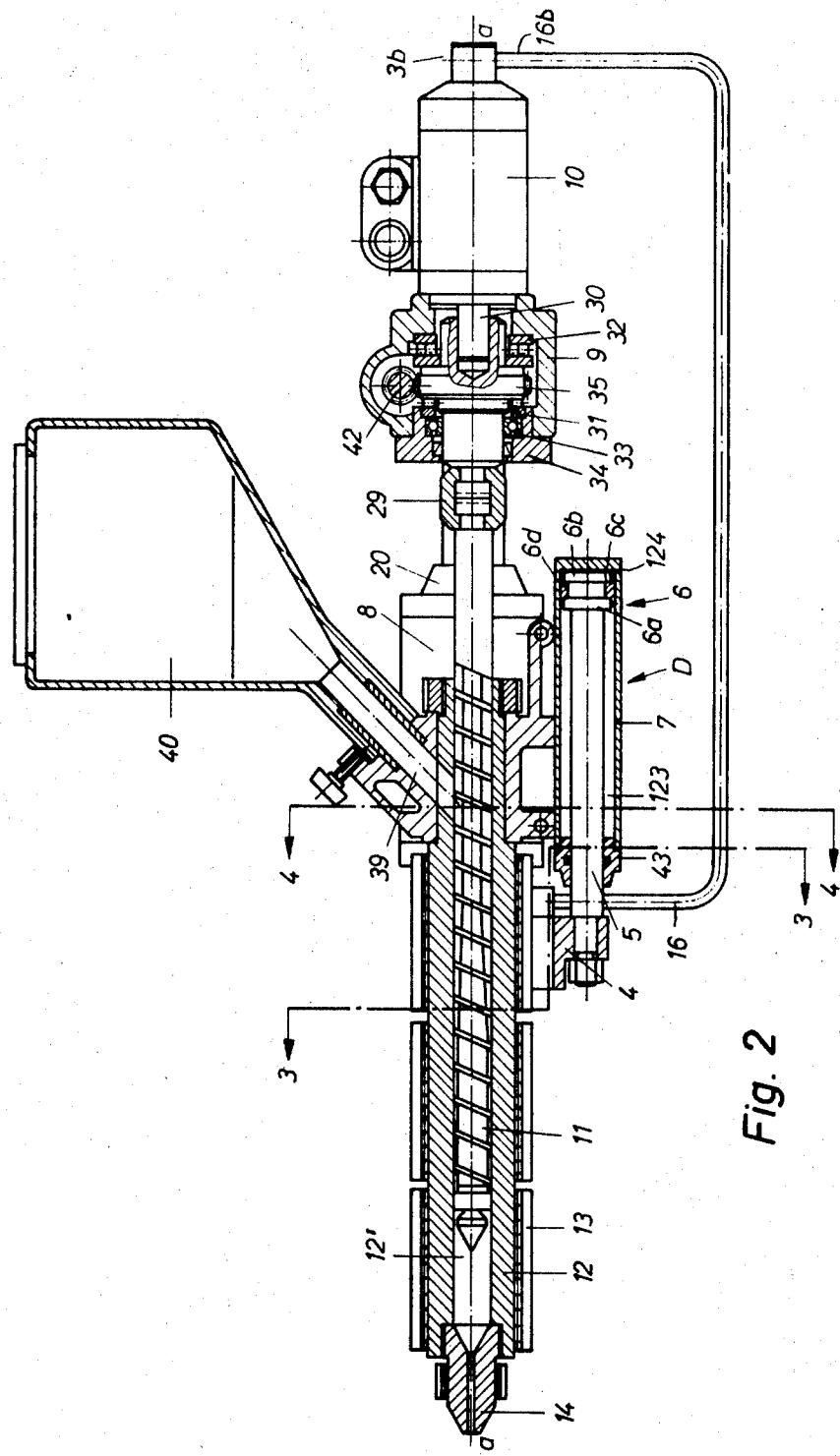
FIG. 2 is a cross-sectional elevational view of the embodiment of FIG. 1.

A stabilizing bridge 4 is clamped to supporting struts 2, 3 as shown particularly in FIGS. 1 and 3. The stabilizing bridge 4 serves to stabilize the injection unit particularly when it is not connected to the stationary mold clamping plate 1.

A hydraulic drive cylinder assembly D which axially displaces the injection unit as a whole on the supporting struts 2, 3 is supported by the stabilizing bridge 4 and thus indirectly by the supporting struts 2, 3. The hydraulic drive cylinder assembly D includes a drive cylinder 7, a drive piston rod 5, a piston 6 and a cylinder head 43. The drive cylinder 7 is preferably permanently connected with a first supporting bridge 8 of a plasticizing cylinder 12. The piston 6 is formed by two annular segments 6a, 6b which are inserted in annular grooves formed in the piston rod 5. The annular segments define along with the rod 5 a recess 6c into which a seal 6d is inserted and retained.

The cylinder 7 defines along with the rod 5, segment 6a and seal 6d a front annular chamber 123, and further defines along with the segment 6b and seal 6d a rear chamber 124. These chambers serve as pressure fluid receiving chambers.

Guide rails 16, which are generally U-shaped (FIG. 2), have their front ends 16a fastened to the stabilizing bridge 4 and their rear ends 16b fastened to the rear ends 2b, 3b of the supporting struts 2, 3. The guide rails 16 provide additional support for the injection unit.

The plasticizing cylinder 12 with its nozzle 14 is displaceably mounted on the struts 2, 3 by means of the supporting bridge 8, while a conveying worm 11 is axially displaceable within a bore 12' of the cylinder 12, is mounted on struts 2, 3, by means of a second supporting bridge 9. The plasticizing cylinder 12 which is provided with the nozzle 14 passes through the clamping plate 1 and preferably has three heating sleeves 13 concentrically arranged along its length, granulate container 40 and a fill passage 39 through which the granulate passes into the bore 12'. The number of heating sleeves can, of course, be any number desired to achieve the desired result.

The supporting bridge 9 has mounted thereon a rotational drive unit 10. The unit 10 has a driven shaft 30 which is connected with the worm 11 through a safety coupling 29. The coupling 29 serves also to protect the shaft 30 from possible structural failure when excessive rotational stresses are encountered in operation.

An intermediate adapter 35 is located within the supporting bridge 9 and between the unit 10 and the coupling 29. The adapter 35 includes a flange 35a from which two cylindrical members 35b and 35c extend. Extending outwardly from the end surface 35e of extension 35b is connection 35f for attachment to the coupling 29. The extension 35b is stepped up at the flange 35a to form a boss 35g. Mounted on the boss 35g is an axial pressure or thrust bearing 31. Adjacent to the thrust bearing 31 but mounted on the extension 35b is a radial bearing 33. Both bearings 31 and 33 are retained in assembly by a retaining plate 34 which in turn is attached to the supporting bridge 9 by retaining pins 34'. The extension 35c is provided with a central bore 35d therein. The bore 35d is adapted to receive the drive shaft 30 which is locked therein to transmit rotary motion in any conventional manner, such as for example, a key 30' which engages an appropriate keyway (not shown) in the bore 35d. Mounted on the extension 35c is an axial pressure or thrust bearing 32. The axial pressure or thrust bearings 31 and 32 serve to absorb the pressure forces generated during axial displacements of the conveying worm 11. The flange 35a is toothed about its peripheral surface so that the adapter 35 can also serve as a drive pinion which meshes with a pinion 42 (FIG. 2) of a tachometer (not shown) monitoring the rate of worm rotation.

Two hydraulic cylinders 8a and 8b formed as preferably integral components of the supporting bridge 8 and disposed symmetrically with respect to an injection axis a-a serve in effecting the relative movement between the conveying worm 11 and the plasticizing cylinder 12. The cylinders 8a and 8b are partly supported by the plasticizing cylinder 12 as a result of their integral attachment to the supporting bridge 8. These hydraulic cylinders 8a and 8b include a front chamber 122 and a rear chamber 17 formed by bores in the supporting bridge 8 and are covered at both axial ends by means of cylinder heads 19, 20 in the embodiments of FIGS 1–11 and 56', 20 in the embodiment of FIGS 11 and 12.

Situated for reciprocal movement within the chambers 17 and 122 of cylinders 8a and 8b are pistons 21 and 22 respectively. These pistons are connected in any conventional manner to one end of the piston rods formed by sleeves 23, 24 respectively. The sleeves 23, 24 are firmly disposed at their other end in the supporting bridge 9 of the conveying worm 11. External threads at both ends of sleeves 23, 24 are each in engagement with an internal thread of the supporting bridge 9 and with an internal thread of the associated pistons 21, 22. The sleeves 23, 24 thus extend from within the bridge 8 to within the bridge 9.

The sleeves 23, 24 are cylindrically configured and include shoulders 23a, 23b and 24a, 24b, respectively which slide on the outer surfaces of the supporting struts 2, 3, respectively. Situated between the shoulders 23a, 23b and 24a, 24b are recesses 25. Extending from the recesses 25 within the shoulders 23a, 23b and 24a, 24b (FIG. 5) are recesses, or grooves, 28 which have a generally helical configuration. These recesses open into the front cylinder chambers 122 of the hydraulic cylinders 8a, 8b at the frontal sides of the pistons 21, 22. The recesses 25 serve as lubrication pockets while the recesses 28 serve as lubricating grooves, both of which can best be seen by reference to FIGS. 5, 7 and 8.

As a result, the pressure medium, which is oil, within the front cylinder chambers 122 of the hydraulic cylinders 8a and 8b enters into the recesses 28, flows into the pockets 25, fills the pockets 25 and flows into the recesses 28 in the portion of the sleeves 23, 24 situation within the bridge 9, and enclosed by shoulders 23b and 24b, and wets the entire outer surface of the struts which serve as slide bearings when there is relative movement between the sleeves 23, 24 and the struts. In the course of a continuous relative movement between the supporting struts 2,3 and the sleeves 23, 24 the outer surfaces of the supporting struts under consideration are automatically wetted with the hydraulic oil pressure medium.

Figure 7:
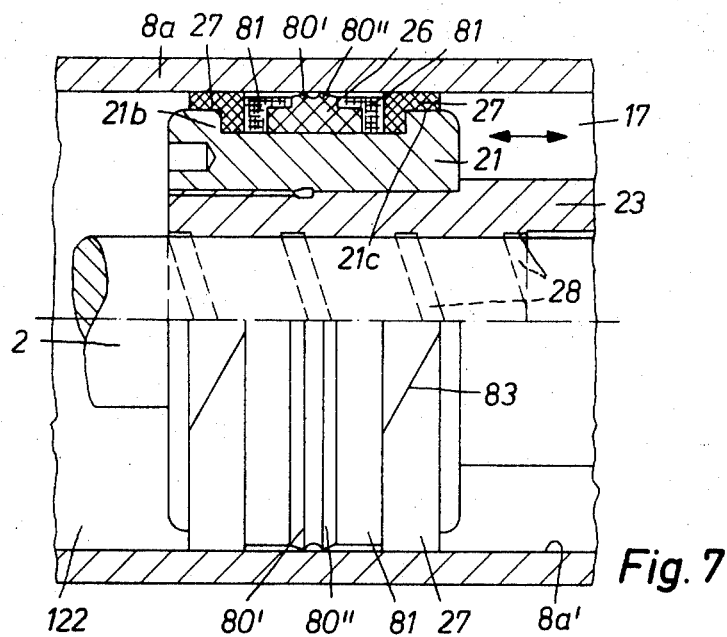
FIG. 7 is a detail view of a portion of the device of FIG. 5, to an enlarged scale, illustrating a different arrangement of the lubricating grooves and a piston seal assembly.
Figure 8:
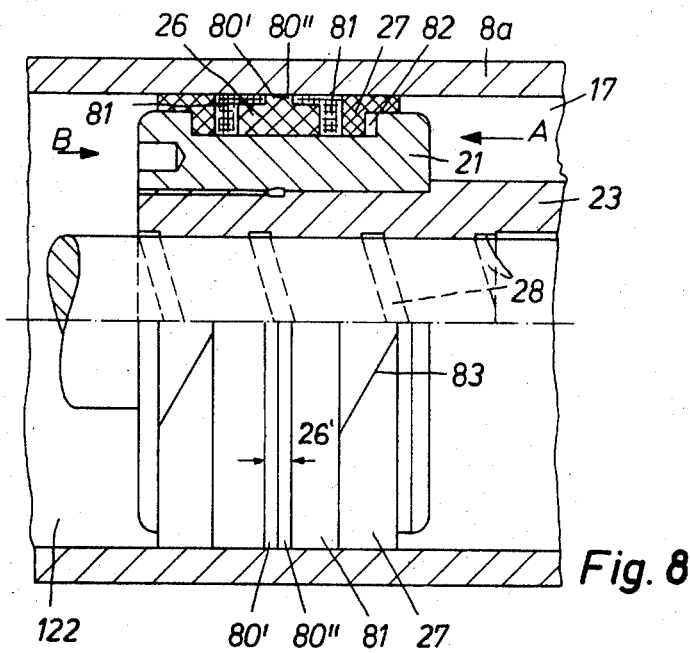
FIG. 8 is a view similar to that of FIG. 7 illustrating the piston seal assembly in a prestressed condition as a result of the application of a pressure medium.

The pistons 21, 22 are provided with a peripheral groove 21a, 22a in which annular seals 26 are inserted. These seals, which can best be seen in FIGS. 7 and 8 are made of rubber and are limited at their frontal faces by reinforcement rings 81 and held in assembly by means of plastic rings 27 which are each axially supported at an annular shoulder 21b, 22b of the respective piston 21 or 22. The annular seals 26 are provided with spaced sealing lips 80', 80'' which contact the inner cylinder walls 8a', 8b' of the cylinders 8a, 8b forming an approximate point contact in which no appreciable pressure is exerted by the lips 80', 80'' against the walls 8a', 8b'. To facilitate installation, each of the rings 27 is provided with a generally transverse slit 83. As a result, the actual outer surfaces 21c, 22c of the metal pistons 21, 22 are spaced from the inner surfaces 8a', 8b' of the associated cylinders 8a, 8b.

As can be seen from a comparison of FIGS. 7 and 8, the annular seal 26 is compressed axially, as seen in FIG. 8, when one of the plastic rings 27 is axially displaced under the pressure of the hydraulic oil, e.g. from the direction A in the chamber 17. With such a displacement in which a cavity 82 is formed, between the ring 27 and the shoulder 21c, the sealing lips 80', 80'' of the annular seal 26 are curved radially outwardly by the axial compression of the annular seal 26 by the ring 27 and are pressed against the inner wall 8a' of the cylinder 8a with a broad area 26' to form a seal. The deformation of the annular seal 26 and its associated lips 80', 80'' thus occurs only when the hydraulic oil is subjected to a relatively high pressure. At a low pressure, due to the hydraulic oil, e.g., from the direction B in the chamber 122, the pistons 21, 22 may thus be moved without the rubber-sealing lips 80', 80'' being subjected to any significant frictional stress.

The sealing lips may also been formed by an plastic material with elastic properties.

In the embodiment of FIGS. 1-8, and as shown in FIG. 4, the longitudinal axis of the single hydraulic drive cylinder assembly D which provides the axial displacement for the entire injection unit lies in a plane b—b which is perpendicular to the plane c-c in which the injection axis a—a and the longitudinal axis of the hydraulic cylinders 8a, 8b for the axial drive of the conveyor worm 11 are disposed. The hydraulic cylinders 8a, 8b for axially driving the conveyor worm 11 and the drive cylinder assembly D for the injection unit are thus disposed within the cooling region of a cooling chamber 41 adjacent an intake section of the plasticizing cylinder 12.

A flange 7' of the drive cylinder 7 of the hydraulic drive cylinder assembly D forms a bottom cover for the cooling chamber 41 in the intake region of the plasticizing cylinder 12.

A cam strip 36 fastened to one of the two struts 2 or 3 which has cams 37 which are adjustably mounted at different vertical levels on the cam strip and a switching column 38 which is fastened to the supporting bridge 9 of the conveying worm 11 and has microswitches which are disposed also at different vertical levels are important components of the hydraulic control which controls the relative movements between the plasticizing cylinder 12 and conveying worm 11. In a well known manner, the microswitches are connected to control the delivery of fluid to the various cylinders and the operation of the motor in unit 10.

Figure 6:
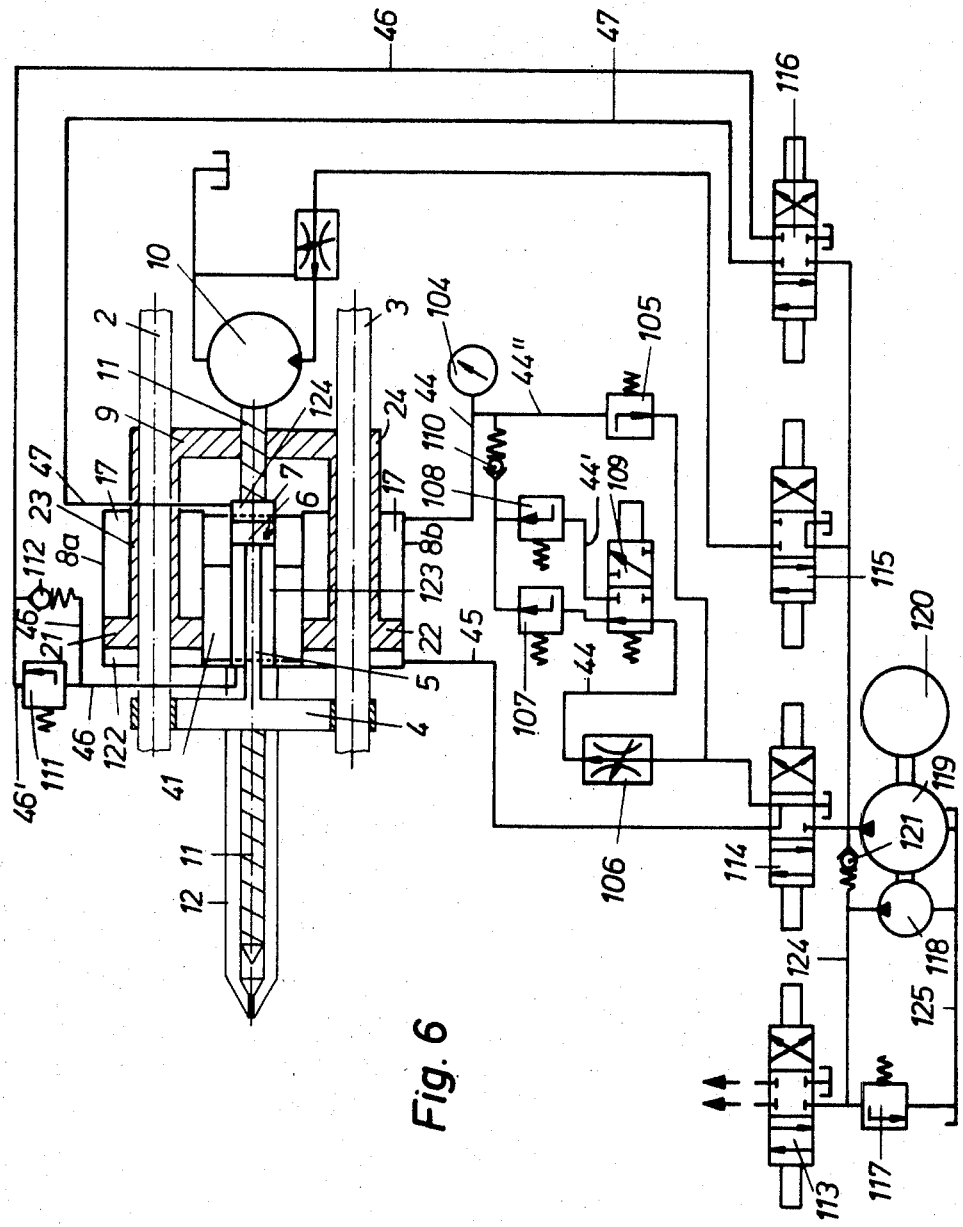
FIG. 6 is a partly schematic partly cross-sectional representation of the hydraulic control of the injection unit of the present invention in connection with an injection molding machine.

As can be seen in FIG. 6, the hydraulic system of the injection molding machine containing the injection unit comprises a pump 118 with a low pump output at high pressure and a pump 119 with a high pump output at low pressure. For a pump output of approximately 3 liters per minute the small pump is able to produce approximately 200 atmosphere gauge pressure while the pump with the greater pump output conveys 48 liters per minute at approximately 160 atmosphere gauge pressure. Both pumps are driven by a common electric motor 120. A main safety valve 117 is connected between a main line 124 of the pumps 118, 119 and a tank 125. The main line 124 leads to a main switching valve 113 for a mold lock of the injection unit, a main switching valve 114 for controlling the injection stroke and the return stroke of the conveying worm 11, a main switching valve 115 for operating the oil-driven fluid motor of unit 10, which is the rotational drive for the conveying worm 11, and a switching valve 116 which controls the hydraulic drive cylinder assembly D for the axial movement of the injection unit as a whole.

From the main switching valve 114, which controls the hydraulic cylinders 8a, 8b, a line 45 leads to the front cylinder chambers 122 and a line 44 with a branch line 44' leads to the rear cylinder chambers 17. A valve 106 for controlling the injection speed as well as a switching valve 109 which operates in dependence on the path or time for initiating the post-pressure phase during the injection process are included in line 44. During the injection phase, the pressure medium passes through a pressure valve 107 in which the injection pressure is set. The injection pressure can be read at the pressure gauge 104. During the post-pressure phase the pressure medium passes through a pressure valve 108 with which the post-pressure can be measured. In both cases the pressure medium passes through a check valve 110 into the rear cylinder chambers 17. Check valve 110 is provided to insure that during the pre-plastification phase the pressure medium which has been displaced from the rear cylinder chambers 17 reaches a dynamic pressure valve 105 via line 44'' to measure the dynamic pressure and cannot escape through the pressure valves 107 or 108, respectively.

The preplastification phase is that phase in which the plastic material accumulating in front of the rotating conveying worm 11 axially drives back the conveying worm due to its dynamic pressure.

Both lines 46 and 47 lead from the switching valve 116 to the cylinder chambers 123, 124 of the cylinder assembly D. A check valve 112 is inserted in line 46 which leads to cylinder chamber 123.

The feeding of the hydraulic circuit of the mold lock by the high pressure pump is separated from the valves 114, 115, 116 by a check valve 121. The line 46 is provided with a branch line 46' in which a pressure maintaining valve 111 is disposed. This pressure maintaining valve 11 is a valve which releases the return flow of the oil from the cylinder chamber 123 to the reservoir 125 of the system only when a certain limit pressure has been exceeded. This limit pressure is greater than the pressure level which is required to hold the nozzle 14 in its proper contact at the injection mold. This means that it is sufficient to move the injection unit onto the injection mold without it being necessary to have the pump 118 continue operating in line 46. The once established contact pressure of the injection or plasticizing cylinder 12 at the mold remains automatically the same due to pressure maintaining valve 111 until a pressure has been built up in cylinder chambers 124 via line 47 which is so high that the above-mentioned limit pressure in the pressure maintaining valve 111 is overcome. A substantially larger piston surface 6 in chamber 124 is utilized than in the valve 111 to aid in effecting this result. Only from this moment on does the pressure medium flow out of the cylinder chamber 123 so that the injection unit moves away from the mold.

Particularly with injection units which are fastened only with the front ends of the supporting struts to the mold closing unit of an injection molding machine or of a transfer unit and which are otherwise freely supported, it may happen in some extreme cases that an undesirable tilting tendency of the injection unit results due to the unilateral thrust generated by the single hydraulic cylinder assembly D acting at a distance from the injection axis $a$—$a$. This unilateral thrust would result in increased stresses particularly on the struts.

Figure 9:
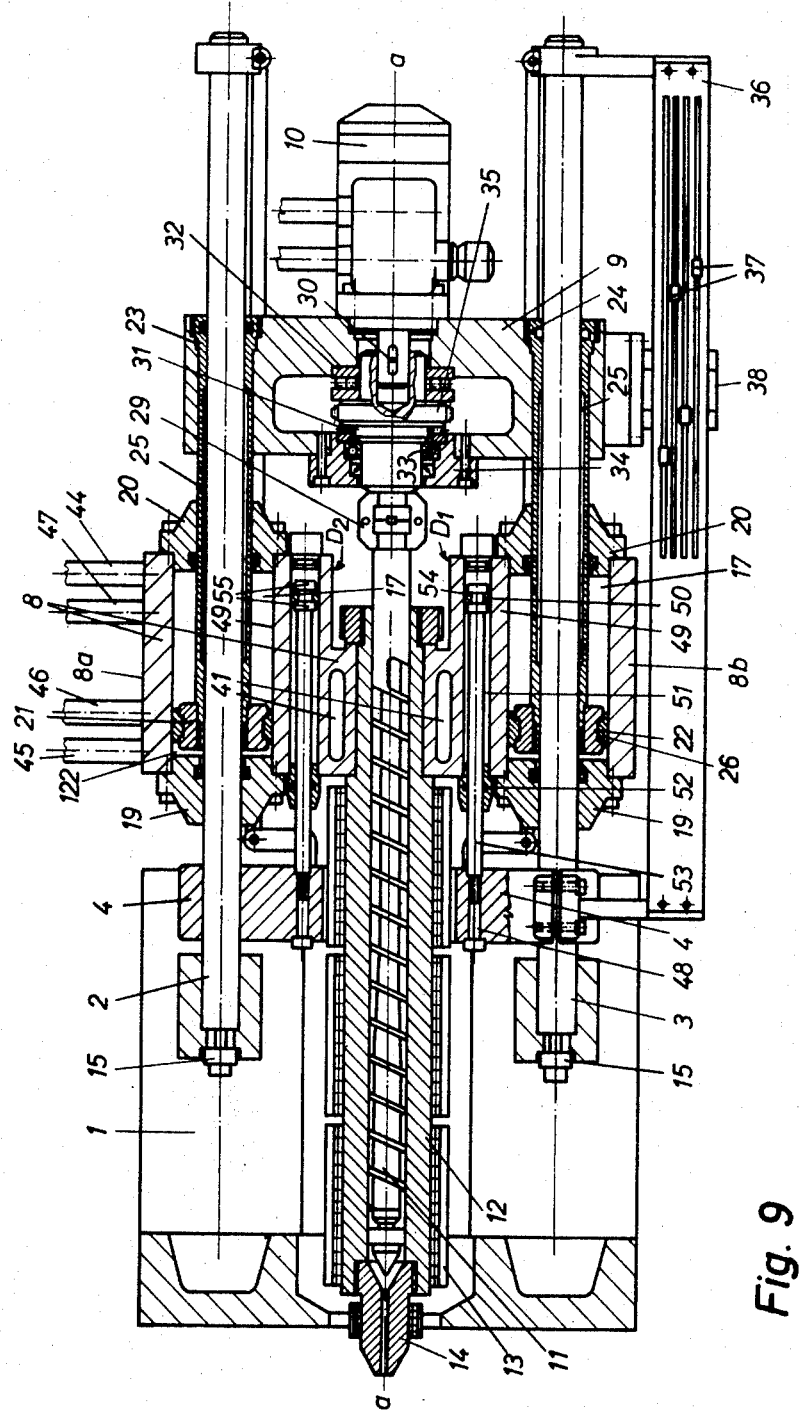
FIG. 9 is a cross-sectional plan view of another embodiment of the injection unit of the present invention.
Figure 10:
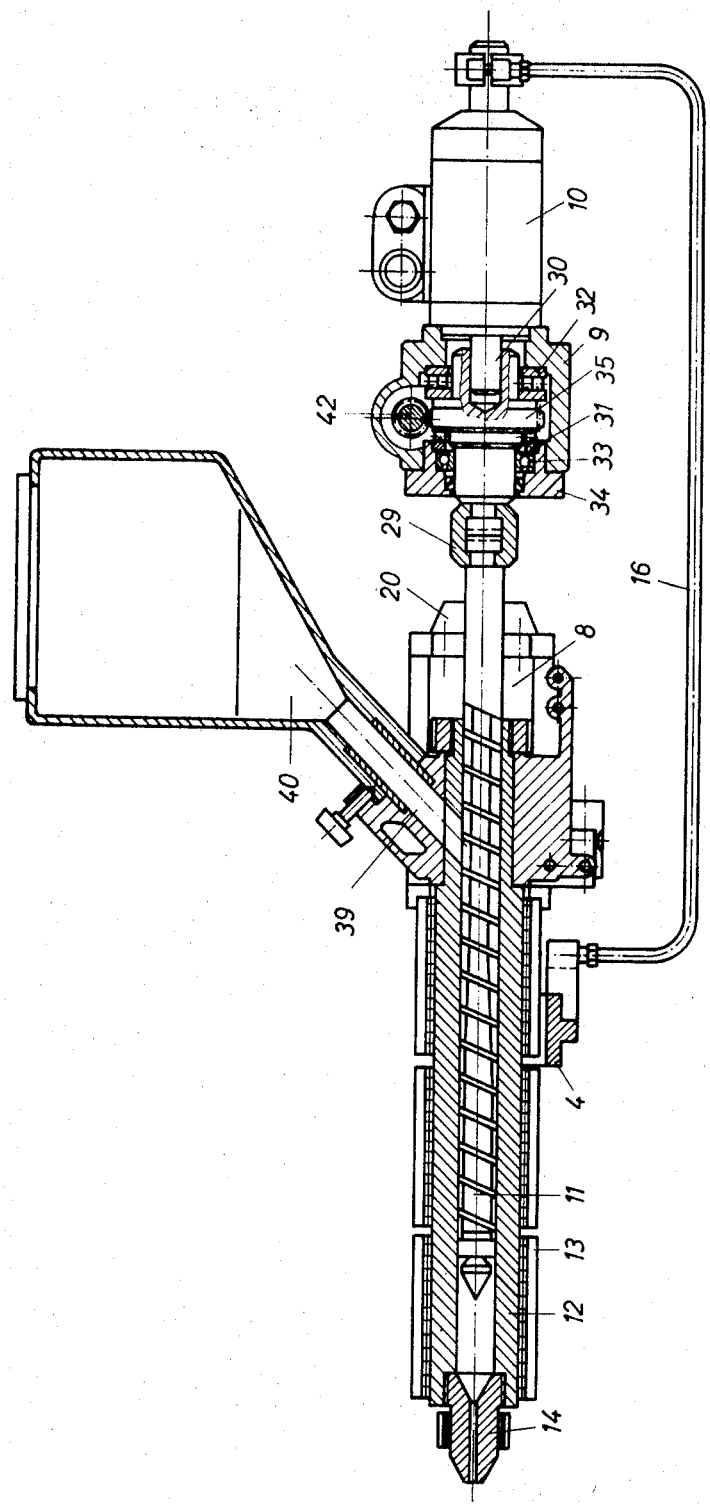
FIG. 10 is a cross-sectional elevational view of the embodiment of FIG. 9.
Figure 11:
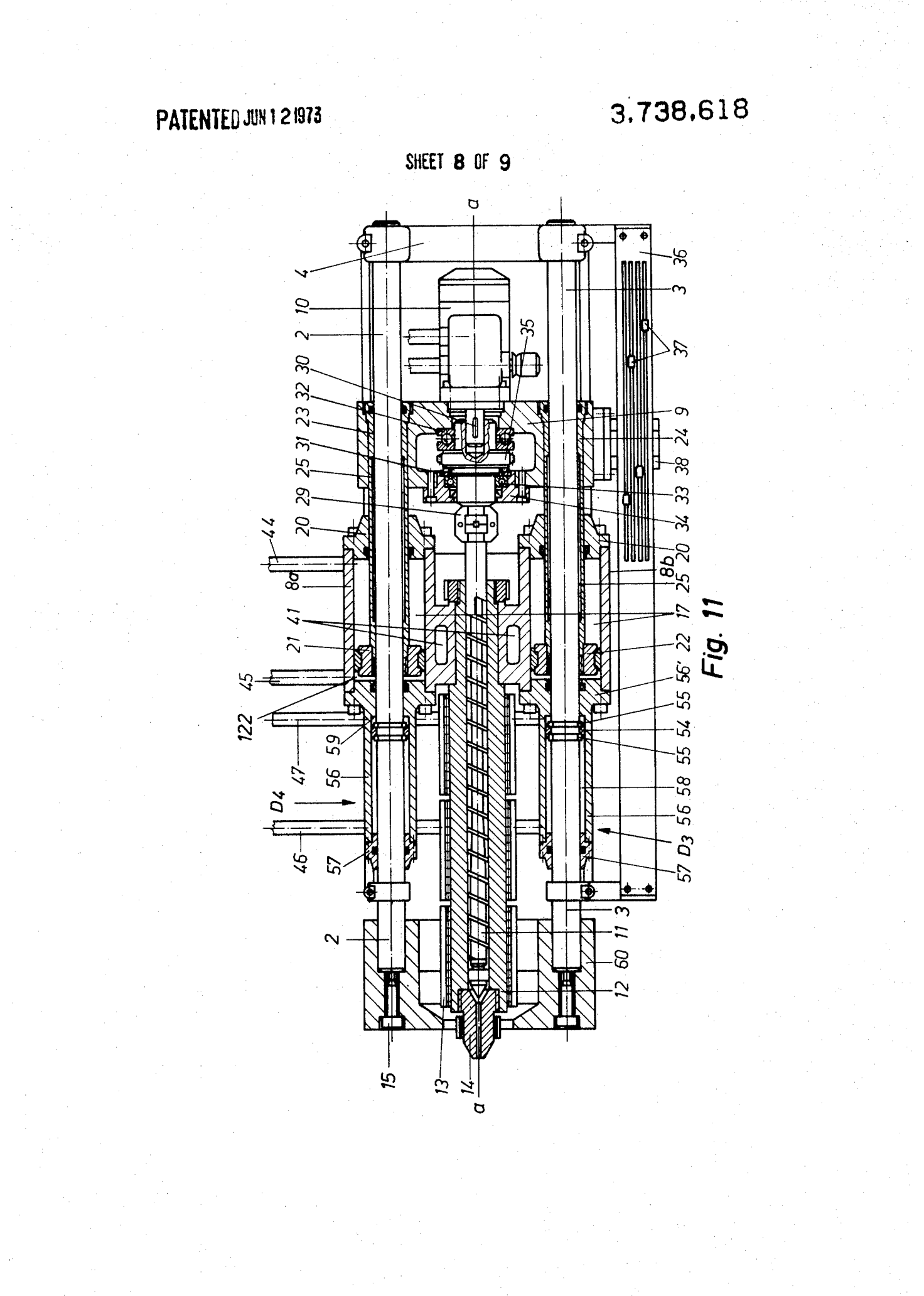

Such a tilting tendency is significantly eliminated in the embodiment of FIGS. 9, 10 and 11 because two hydraulic cylinders are provided which are arranged symmetrically to the injection axis $a$—$a$.

Referring more particularly to FIGS. 9-11, two hydraulic cylinder assemblies $D_1$, $D_2$ could be alternatively substituted for the single hydraulic cylinder assembly D of FIGS. 1-8.

Supported on the stabilizing bridge 4 and thus indirectly on the supporting struts 2, 3, are a pair of stationary piston rods 53 of pistons 50 for the two drive cylinder assemblies $D_1$, $D_2$ which axially displace the injection unit as a whole. Each assembly $D_1$, $D_2$ includes a drive cylinder 49, the previously mentioned piston rod 53 and piston 50, and a cylinder head 52.

The cylinders 49 are formed by bores 51 in the supporting bridge 8 of the plasticizing cylinder 12. The drive cylinders 49 are in a horizontal plane when the injection unit is horizontally disposed, as is the injection axis $a$—$a$. Thus, the cylinders 49 are disposed between the hydraulic cylinders 8a, 8b, which effect the relative movement between the conveying worm 11 and the plasticizing cylinder 12. The pistons 50 of the drive cylinder assemblies $D_1$, $D_2$ are each formed by annular segments 55 and an annular piston seal 54. The annular segments 55 are inserted in annular grooves formed in the associated piston rod 53 so that they are axially fixed and hold the piston seal 54 in assembly.

The described embodiment according to FIGS. 9 and 10 is particularly suited for connecting mold clamping plates which have a relatively large structural depth. This is generally the case when the pressure cylinders of the mold clamping unit are also accommodated in the mold clamping plate, so that the movable support for the other of the two mold halves is also disposed on the piston rods of the pressure cylinders.

The above reference to pressure cylinders is intended to encompass those hydraulic drive cylinders which build up the closing pressure for the mold by a pulling movement of the piston rods.

Figure 12:
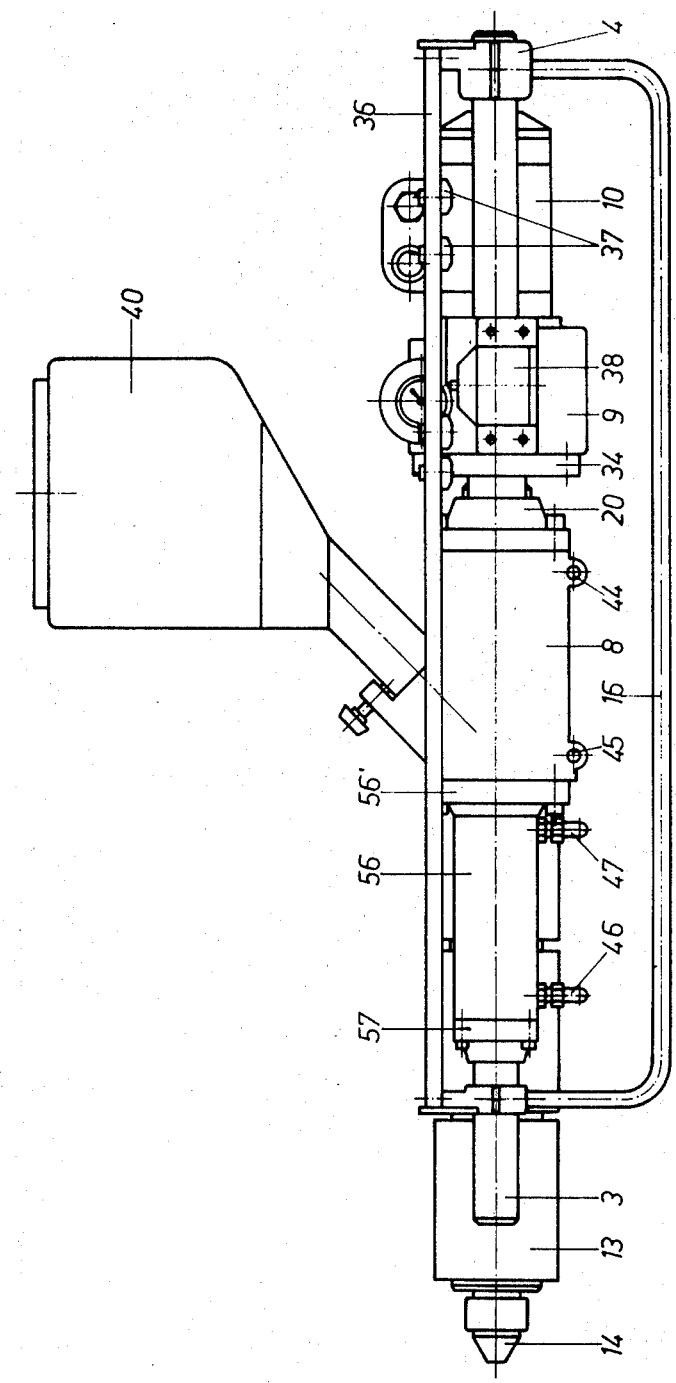
FIG. 12 is a cross-sectional elevational view of the injection unit of FIG. 11.

The embodiment of the present invention illustrated by FIGS. 11 and 12 differs from that illustrated by FIGS. 9 and 10 in that two hydraulic drive cylinder assemblies $D_3$, $D_4$, which axially drive the injection unit as a whole, are disposed coaxially to the hydraulic cylinders 8a, 8b, which in turn effect the relative movement between the conveying worm 11 and the plasticizing cylinder 12. Each assembly $D_3$, $D_4$ includes a drive cylinder 56 formed by a sleeve which is joined with a flange 56' to the frontal face of one of the hydraulic cylinders 8a, 8b, a piston assembly including one of the respective struts 2, 3, and a cylinder head 57. The flange 56' also serves, as stated above, as the cylinder head for the hydraulic cylinder 8b. The piston assembly for each of the cylinder assemblies $D_3$, $D_4$ includes in addition to a respective strut 2, 3, annular segments 55 which are firmly seated on the struts 2, 3, and a piston seal 54. The annular segments 55 are inserted in corresponding annular grooves of the associated strut and are thus axially fixed with respect to each other and the seal 54. As a result, the seal 54 is held in assembly by the annular segments 55. The cylinder head 57 closing one end of the drive cylinder 56 as well as flange 56' are penetrated in a sealing manner by the associated strut 2 or 3, respectively and form with the cylinder 56 an annular chamber 58 for actuating fluid containment.

It will be understood that the above description of the present invention is susceptible to various modifications, changes and adaptations, and the same are intended to be comprehended within the meaning and range of equivalents of the appended claims.

I claim:

1. In an injection unit, particularly for an injection molding machine for processing plastics, the injection unit defining an injection axis and including a clamping plate, a first supporting bridge, at least one hydraulic drive cylinder, additional hydraulic cylinders, piston assemblies mounted within the hydraulic cylinders, a plasticizing cylinder movable in the direction of the injection axis by the hydraulic drive cylinder, a conveying worm, supporting struts mounted on the clamping plate and supporting the first supporting bridge, the hydraulic drive cylinders, the additional hydraulic cylinders, the plasticizing cylinder, and the conveying worm, the conveying worm being axially movable relative to the plasticizing cylinder by the additional hydraulic cylinders, the improvement comprising: a second supporting bridge supported by said supporting struts and supporting said conveying worm; sleeves having recesses on their inner surfaces, said sleeves being fastened to said second supporting bridge with one each concentrically mounted on said supporting struts to be slidable relative thereto, said sleeves having their inner surfaces facing the outer surface of the struts with which they are concentrically mounted, said piston assemblies being mounted and supported one each on said sleeves, said recesses being arranged to receive a flow of fluid for lubricating the outer surfaces of said struts during said relative movement.

2. An injection unit as defined in claim 1, wherein said sleeves have frontal faces, said additional hydraulic cylinders form rear chambers with said sleeves, said piston assemblies and said struts and said recesses open into said rear chambers at said frontal faces.

3. An injection unit as defined in claim 1 wherein said sleeves are each provided with a center section and two end sections on either side of said center section, and wherein said center section is provided with an annular chamber serving as a lubricating pocket and said end sections are provided with said recesses.

4. An injection unit as defined in claim 3, wherein the recesses have a helical configuration.

5. An injection unit as defined in claim 3, wherein said sleeves are each provided with external threads at both end sections, said second supporting bridge and said piston assemblies are provided with internal threads, and wherein each of said sleeves threadedly engages with both end sections, said second supporting bridge and a piston assembly, respectively.

6. An injection unit as defined in claim 1, wherein there are two additional hydraulic cylinders arranged symmetrically to the injection axis.

7. An injection unit as defined in claim 6, wherein at least two hydraulic drive cylinders are provided, said hydraulic drive cylinders arranged symmetrically with respect to said injection axis.

8. An injection unit as defined in claim 7, wherein said additional hydraulic drive cylinder and said drive cylinders are disposed with their driving axes and said injection axis in one plane.

9. An injection unit as defined in claim 7, wherein said hydraulic drive cylinders are disposed coaxially with said additional cylinders.

10. An injection unit as defined in claim 9, wherein said first supporting bridge includes a frontal face, and wherein said hydraulic drive cylinders are formed by sleeves which are each flanged to the frontal face of said first supporting bridge and cylinder heads at one end thereof, said hydraulic drive cylinders enclosing an associated one of said supporting struts.

11. An injection unit as defined in claim 10, wherein each of said hydraulic drive cylinders includes a piston assembly, and wherein each of said piston assemblies is firmly seated on an associated one of said supporting struts.

12. An injection unit as defined in claim 11, wherein said piston assemblies are each formed by a piston including two annular segments extending outwardly from the piston and a piston seal, said associated struts each including annular grooves, said annular segments each constituted by two semicircular portions, said annular segments being inserted in said grooves of said struts to thereby axially fix said segments relative to each other and to provide along with said associated strut a seat for said piston seal.

13. An injection unit as defined in claim 1, wherein there is a single hydraulic drive cylinder provided, and wherein said drive cylinder is disposed eccentrically with respect to the injection axis.

14. An injection unit as defined in claim 1, wherein said additional hydraulic cylinders are formed by bores in said first supporting bridge and cylinder heads at the ends of each bore.

15. An injection unit as defined in claim 14, wherein each piston assembly includes an annular groove within which an annular rubber seal and two plastic rings disposed one on each side of said seal are supported, and wherein the annular seal is provided with a plurality of annular sealing lips extending outwardly from the peripheral surface of said seal, said lips being pressed against the inner wall of said bore only when said annular seal is axially compressed due to said fluid flow in said cylinder.

16. An injection unit as defined in claim 14, wherein each of said bores forms with an associated piston assembly and sleeve a rear cylinder chamber, said injection unit further comprising a hydraulic line connected to said chamber, said hydraulic line including a branch line, with a switching valve for initiating a post pressure phase of the injection process and a pressure valve for measuring the injection pressure included in said hydraulic line and a further pressure valve for measuring the pressure during the post pressure phase included in said branch line.

17. An injection unit as defined in claim 1, wherein said first supporting bridge defines a cooling region, and wherein said additional hydraulic cylinders and said drive cylinder are disposed adjacently to said cooling region.

18. An injection unit as defined in claim 1, further comprising a stabilizing bridge which is clamped to said supporting struts, and wherein said hydraulic drive cylinder includes a piston rod which is fastened to said stabilizing bridge.

19. An injection unit as defined in claim 18, wherein said hydraulic drive cylinder further includes a piston assembly mounted on said piston rod, said cylinder, said piston rod and said piston assembly define a front cylinder chamber, said injection unit further comprising a hydraulic line connected to said chamber, said hydraulic line including a branch line, with a check valve in said hydraulic line and a pressure maintaining valve in said branch line.

20. An injection unit as defined in claim 1, further comprising a cam strip fastened to one of said supporting struts, said cam strip including cams supported at different levels thereon, a switching column fastened to said second supporting bridge, said switching column includes microswitches, arranged at different levels, said cams and said microswitches cooperating to control said relative movement.

21. An injection unit as defined in claim 1, wherein said sleeves are fastened to said second supporting bridge, and wherein said recesses are arranged to receive a flow of fluid for lubricating the outer surfaces of said struts during said relative movement.

* * * * *